US010374432B2

(12) United States Patent
Gilbert

(10) Patent No.: US 10,374,432 B2
(45) Date of Patent: Aug. 6, 2019

(54) DEVICE FOR REDUCING THE ELECTRIC POWER CONSUMED BY AT LEAST ONE POWER ELECTRIC LOAD, ASSOCIATED SYSTEM AND METHOD

(71) Applicant: ERGYLINK, Levallois Perret (FR)

(72) Inventor: Jerome Gilbert, Levallois Perret (FR)

(73) Assignee: ERGYLINK, Levallois Perret (FR)

( * ) Notice: Subject to any disclaimer, the term of this patent is extended or adjusted under 35 U.S.C. 154(b) by 288 days.

(21) Appl. No.: 15/306,888

(22) PCT Filed: Apr. 22, 2015

(86) PCT No.: PCT/IB2015/052953
§ 371 (c)(1),
(2) Date: Oct. 26, 2016

(87) PCT Pub. No.: WO2015/170212
PCT Pub. Date: Nov. 12, 2015

(65) Prior Publication Data
US 2017/0054299 A1 Feb. 23, 2017

(30) Foreign Application Priority Data
May 6, 2014 (FR) ..................... 14 01037

(51) Int. Cl.
H02J 3/14 (2006.01)
H02J 3/28 (2006.01)
(Continued)

(52) U.S. Cl.
CPC ............... H02J 3/383 (2013.01); H02J 3/14 (2013.01); H02J 3/386 (2013.01);
(Continued)

(58) Field of Classification Search
CPC ....................................................... H02J 3/383
See application file for complete search history.

(56) References Cited

U.S. PATENT DOCUMENTS 5,699,276 A 12/1997 Roos
6,528,957 B1 * 3/2003 Luchaco ............. H05B 37/034
307/31
(Continued)

FOREIGN PATENT DOCUMENTS

FR 1 400 496 A 4/1965
FR 2 976 415 A1 12/2012
(Continued)

OTHER PUBLICATIONS

International Search Report, dated Jun. 9, 2015, from corresponding PCT application.

Primary Examiner — Jeffrey M Shin
(74) Attorney, Agent, or Firm — Young & Thompson

(57) ABSTRACT

A method relating to a device (1) for driving at least one power electric load (2) with the aim of reducing the electric power liable to be consumed or which is actually consumed in a terminal installation (4) of an electrical network including an electrical energy meter behind which the device is connected. A system (12) including such a device and at least one power electric load (2) is also described. Also described is a method for exploiting a plurality of systems (12) within an electrical network as well as the applications of this method for the management of an electrical network including intermittent-production energy sources, within the framework of a service for managing reduction in electrical energy consumption and/or to supplement a service for providing sanitary hot water, and/or heating, and/or cooling, and/or for providing electricity.

26 Claims, 4 Drawing Sheets

(51) Int. Cl.
 *H02J 3/38* (2006.01)
 *H02J 13/00* (2006.01)

(52) U.S. Cl.
 CPC ............ *H02J 13/0006* (2013.01); *H02J 3/28* (2013.01); *H02J 13/002* (2013.01); *H02J 13/0079* (2013.01); *H02J 2003/143* (2013.01); *Y02B 70/3225* (2013.01); *Y02B 70/3266* (2013.01); *Y02B 90/222* (2013.01); *Y02B 90/2615* (2013.01); *Y02P 80/14* (2015.11); *Y04S 20/12* (2013.01); *Y04S 20/222* (2013.01); *Y04S 20/242* (2013.01); *Y04S 40/121* (2013.01)

(56) References Cited

U.S. PATENT DOCUMENTS

| | | |
|---|---|---|
| 6,624,532 B1 | 9/2003 | Davidow et al. |
| 2010/0030391 A1 | 2/2010 | Oury et al. |
| 2014/0058575 A1 | 2/2014 | Ashworth et al. |
| 2014/0020730 A1 | 7/2014 | Delon et al. |

FOREIGN PATENT DOCUMENTS

| | | |
|---|---|---|
| WO | 2008/017754 A2 | 2/2008 |
| WO | 2012/003404 A1 | 1/2012 |

\* cited by examiner

DEVICE FOR REDUCING THE ELECTRIC POWER CONSUMED BY AT LEAST ONE POWER ELECTRIC LOAD, ASSOCIATED SYSTEM AND METHOD

TECHNICAL FIELD

The invention falls within the scope of electrical network management.

BACKGROUND OF THE INVENTION

Modern electrical networks are becoming increasingly complex as shown in patent FR2976415. They include an increasing proportion of variable production and distribution infrastructures close to saturation in front of constantly growing needs. The proportion of intermittent production of solar or wind origin for example is continuously growing in the energy mix of most countries engaged in a process of energy transition towards more renewable energy. However, the increase in the proportion provided by renewable energy sources having intermittent production in the energy mix beyond 30% requires increased flexibility of the electrical network, in particular, for controlling the reduction in consumed power and for balancing demand and the production of electrical energy at all times. The possibility of controlling the reduction, or even shedding, of consumption also increases the quality of service provided by avoiding having to generally offload parts of the network in the event of a lack of production having caused an unforeseen decrease in intermittent production or the occurrence of an incident affecting available power. Solutions like the one described in patent WO 2008017754 are known but are not fully satisfactory because they require sophisticated infrastructures as well as the measurement and transmission of consumption in the framework of centralized management.

This invention can be advantageously combined with the device for driving at least one subassembly capable of transforming electrical energy and of storing it in thermal form described in patent FR1400496 to provide a complete solution for improving the flexibility of an electrical network with the aim of balancing consumption and production of energy by acting on the power consumed in the appropriate direction.

This invention falls within the general framework of so-called "smart grids".

SUMMARY OF THE INVENTION

The purpose of the present invention is at least to partially correct the aforementioned problems by proposing a device for driving at least one power electric load with the aim of reducing electric power likely to be consumed in a terminal installation of an electrical network comprising an electrical energy meter behind which the device is connected.

The device according to the invention is designed to receive at least one setpoint whose reception triggers the limitation, for a determined time, of the power that can be consumed by the at least one power electric load, at a determined upper limit value that is lower than the maximum operating power of the at least one power electric load.

The invention aims to restrict access to power of an apparatus which can be previously set OFF or ON when at the least one setpoint is received.

The device according to the invention comprises ways for receiving at least one setpoint transmitted by means of remote control. It is provided for example that the device comprises a subassembly of reception of remote control orders from the electricity tariff management system, for example in France a TCFM (ripple control) receiver at 175 Hz or 188 Hz or PLC (power-line communications) receiver compatible with "Linky" (registered trademark of ERDF). It is also provided to integrate into the device a radiofrequency reception or transceiver subassembly or PLC compliant with appropriate standards, directly linked or linked via a local Internet gateway, with a "M2M" (machine to machine) and/or "IoT" (internet of things) communication infrastructure.

Moreover, the invention is particularly economic in terms of bandwidth. The transmission of one single setpoint is sufficient to limit or reduce the consumption of a predetermined amount of electrical energy. A unidirectional communications system simultaneously addressing a plurality of recipients is sufficient for effectively implementing the invention. The setpoint can indeed be reduced to a binary order without a related setting. In this case it is a simple latent or effective order for shedding a predetermined amount of energy. The predetermination of the amount of energy can be direct via a command imposing a given quantity of energy to be shed, or indirect via a command imposing the length of the shedding of a known power. The resumption of the operation of the at least one driven power load at its nominal load is controlled locally by the device when the time has elapsed. This time is imposed by the setpoint received or calculated according to the amount of energy imposed by the setpoint. The variant where the amount of energy is directly imposed by the setpoint is particularly advantageous in that it releases the control system from having to manage the devices individually by assigning them with a specific shedding time depending on the power of the at least one driven load that needs to be previously known to the control system. It is also provided in some implementation variants that the at least one setpoint determines the shedding time and a power value. The power value is for example the limit not to be exceeded in the terminal installation or, more advantageously, the value of the reduction of expected power of reception of the at least one setpoint.

In the case of devices forming at least one power electric load according to the invention which offer only two operating modes, the OFF mode and the ON mode at nominal power, the implementation of the invention leads to prevent the setting ON of the at least one power electric load over a determined time. In the case of devices that may operate at multiple power levels like for example some heating or air-conditioning apparatuses, or in the case of a device limiting the power consumed in the installation at a maximum value imposed by the reception of the at least one setpoint by appropriately managing a plurality of power appliances, the implementation of the invention leads to prevent the setting ON of the at least one power electric load beyond a given power over a determined time. This is latent consumption shedding.

It is also provided, in the case where the at least one power electric load is ON when the at least one setpoint is received, that power consumed by at least one power electric load is reduced, for a determined time, to a determined value that is less than the power that was consumed before the reception of the at least one setpoint. This is effective consumption shedding. In economic models related to the technical implementation of the invention, the remuneration of relevant stakeholders that agree to be denied the use of at least one of their apparatuses beyond a certain level of power for a given time may be valued differently depending on whether the power imposed by the reception of the setpoint is reduced while the device was previously ON at a higher power or whether it was not. The possibility of such a differentiation requires a return pathway from the relevant terminal installation to the manager. For example, this return pathway can be part of a specific information system as proposed by means of a "power box" connected to a bidirectional transmission system. It can also for example be the monitoring of the load curve which allows the presence of a communicating meter in the terminal installation, for example, in France a "Linky" (registered trademark of ERDF) meter.

The invention provides that the duration of the said determined time is imposed on the device by the reception of the at least one setpoint at a given power of the at least one driven load. For example this can be a setpoint designed for blocking access to power beyond a determined threshold of 10 minutes. In this case, when the emission of the at least one setpoint must be associated with an amount of energy, for example as part of an economic valuation, an information system from the emission of the at least one setpoint, which knows the power of the at least one driven load, needs to calculate the corresponding amount of energy.

It is also provided that the at least one setpoint is associated with a predetermined amount of energy. Reception of the at least one setpoint triggers control of a specified power for a determined time which actually involves controlling a predetermined amount of electrical energy. Control of said predetermined amount of electrical energy is implicit when the reception of the setpoint requires an operating time at a limited or given reduced power. Control of said predetermined amount of electrical energy is explicit when the reception of the setpoint directly imposes an operation at limited or reduced power for a given amount of electrical energy.

It is also provided that the duration of said determined time is calculated by the device according to the value of a power and said predetermined amount of energy. This is so that the emission of the at least one setpoint may be associated with the reduction of effective or potential consumption of a predetermined amount of electrical energy.

The length of said determined time is calculated by any algorithm implemented by the execution of the at least one setpoint in a microprocessor, even if the aim is not to calculate in the arithmetic sense of the term but for example manage saved value tables.

The aim is to ensure that the at least one setpoint, both for the information system that transmits it and for the at least one device according to the invention which receives it, is directly associated with a predetermined amount of electrical energy. For example a setpoint designed for blocking access to power beyond a determined threshold up to the point of having avoided consumption of 0.5 KWh. For this type of setpoint, the device according to the invention determines the appropriate time for the at least one given power load. The invention can then be implemented in an electrical network by disregarding knowledge of the powers of driven loads. Thus the invention can be effectively implemented in electrical networks that do not offer uplink transmission channels from terminal installations towards the driving system.

The value of the power taken into account in the limitation or reduction of power consumption by the at least one load depends on the possible operation modes of the at least one load.

For example, where the at least one power load has only two modes of operation, the OFF and the ON status at its nominal power, the latent or effective load shedding is the nominal power of the at least one load. In the case of possible modes of operation at multiple power levels, latent or effective shed power is calculated by the difference between the maximum possible operating power and the limited or reduced power imposed by the reception of the setpoint.

The invention provides that said value of a power is obtained from information contained in a memory of the device. This may be a nominal value of power written into the program memory which is sufficiently accurate when power load production tolerances are sufficiently controlled. This variant is particularly well suited to cases where the devices according to the invention and the at least one driven load are structurally associated in the form of a unique apparatus. A more accurate variant of the above consists in including a calibration step in the manufacturing method for improving the accuracy of the saved value of power. For example, this value, or a variable corrective applicable to a fixed standard value, is saved in non-volatile memory such as EEPROM or in a specific area of the flash memory used to store the microcontroller program. It is also provided, especially when the devices according to the invention are apparatuses separate from the at least one power load to be driven, a setting or learning step of one or more operating powers of the at least one driven load during installation or during operation.

It is also provided that the device according to the invention further comprises means for communicating with the electrical energy meter of the terminal installation of the network behind which the device is connected. The meter of the electrical installation comprises a calibrated metrology subassembly approved by the authorities for carrying out financial transactions. The use of this measuring apparatus in the framework of the quantification of shed energy according to the invention in view of its economic valuation is therefore particularly advantageous. An appropriate link which depends on the type of meter is further provided to allow the at least one device according to the invention to receive useful information. It is provided that the communication between the meter and the at least one device according to the invention is done either directly or via a gateway responsible for broadcasting information to all the devices of the relevant terminal installation. The information from the meter can be obtained by a direct link between the meter and the device or via any gateway for broadcasting all or part of the meter information in the corresponding terminal electrical installation. In France for example, all electronic meters are equipped with a "customer remote information" output that is designed to be operated by optional automatons in the terminal electrical installation. This output, which has been designed to be connected by wire to the input of a centralized power manager, continuously transmits composite structured information comprising basic information produced internally and/or retransmitted by the meter. This information may be, for example, a meter identification number, the tariff option and subscribed intensity, information related to the current or future tariff period, warning of excess use of power subscribed, instant and maximum intensity absorbed by the terminal installation, apparent power drawn off and metering indexes. There are other equivalent means enabling meters to transmit information to external apparatuses. For example those used in Germany which are based on the IEC62056-21 standard operating an infrared link. It may also be a USB connection, wired or proprietary optical connection, a PLC or radio connection, etc. It is also provided that the device according to the invention uses information from the led that blinks for each watthour consumed on most electronic meters through an appropriate optoelectronic detector or detects the passage of the visual marking on the disc on electromechanical meters. The device according to the invention in a variant fitted for measuring the elapsed time between two blinks of the LED, or, where appropriate, between two passages of the marking of the disc on an electromechanical meter can calculate the amount of power consumed in the installation. In its most recent versions such as "Linky" (registered trademark of ERDF) in France, the meter of the electrical installation also includes a communication subassembly capable of allowing the transmission of the load curve to a remote information system. Knowledge of the full load curve advantageously completes the invention by allowing a posteriori control of the effectiveness of the shedding ordered in each installation. This, for example, allows detection of derogation operations making shedding commands inoperative as well as characterized shedding fraud. Anomaly detection through knowledge of the load curve, where appropriate, allows the information system to correct incorrect economic valuations or trigger any other appropriate action. In certain implementation variants of the invention, the means included in the device for communicating with the meter behind which it is connected are also used to receive the at least one setpoint.

The invention also provides that said power volume may be obtained from the at least one measurement from the electrical energy meter behind which it is connected in the terminal electrical installation. Thus, the devices according to the invention which have an appropriate connection with an energy meter can advantageously implement a self-learning step using the meter information feedback in response to the at least one load in one or more operating modes determined by the device. Several ON/OFF cycles are provided to determine with certainty the power(s) of the at least one power load within a general measurement of power aggregating the consumption of a plurality of loads in the terminal electrical installation.

The invention also provides that said power value is obtained from means for measuring an electric power comprised in the device. Variants of the device according to the invention are also provided which further comprise means for measuring at least one power value consumed by the at least one power electric load. According to the required accuracy in the framework of implementation of the invention, a simple measurement of the current multiplied by a constant corresponding to the nominal value of the network voltage, through to an accurate measurement of the power using components provided for metrology, may be suitable.

The invention further provides that the time during which power is limited and/or reduced takes into account the electrical network voltage in said terminal installation. The actual metered duration of said determined time, for a given power, corresponds to an amount of energy not consumed in a latent or effective mode. The invention provides for rigorously determining the duration for which access is limited to the power and/or period of time during which the power consumed by the at least one load is reduced by modulating the time metered proportionally to the variation of the network voltage around its nominal value. This refinement of the invention produces its effects even when the at least one driven load is off and therefore the current is zero as is the power likely to be measured by conventional means.

It is provided that the device according to the invention further comprises means for communicating with at least one information system (directly or indirectly external or home automation internal). In some variants of the invention, the communication between the device and the at least one information system is direct by means of access to a communications network integrated into the device. In other variants, communication is done via a device acting as a gateway function between means of communication embedded in the device and means of communication needed to access the network allowing access to the at least one information system. The devices acting as a gateway function may include "boxes" of all types but also a variant of the device according to the invention. When a device according to the invention comprises means for communicating with a network which are particularly sophisticated, expensive or requiring a SIM card, for example, it is particularly advantageous to give it a gateway role to allow other devices in the same terminal installation to access the network too. Other devices only embedded with simple and less costly local scope means of communication. The at least one system information relates mostly to external service operator systems but it is also provided as an information system specific to the terminal installation in which the devices according to the invention are installed. Such an internal system can for example be a home automation system or a sophisticated energy management system such as those required in the case of decentralized energy production. Communication with the at least one information system is usually understood as being bidirectional, but the invention also provides for variants using unidirectional communication means, at least in the framework of communications between some points of the system thus formed. The at least one information system ensures for example the reconciliation in a database between a customer account, shedding orders transmitted, timestamped and differentiated, where appropriate, between any latent shedding orders and effective shedding orders, amounts of shed energy, where appropriate, differentiated according to whether they are latent or effective, amounts credited to the customer account which are expressed in energy units or in monetary units by application of an appropriate economic model etc. It is provided that the invention may be implemented without uplink communication path from terminal installations towards the information systems that are linked to the management or administration of the electrical network. Nevertheless, the presence of a return pathway in the device is advantageous for example for appropriately synchronizing consumption in installations served by the same lines or same MV/LV transformer, or for example making the system more robust with respect to the risk of overload but also with respect to the risk of fraud by circumventing accounted shedding. The uplink, like the downlink according to the implementation variants, can use direct communications such as a GSM modem or integrated PLC. It can also use indirect means as a gateway. Such means are for example a "power box", a "telecom box". It may also be a communicating meter not only integrating a bidirectional link for communicating with the upstream systems, but also a unidirectional or bidirectional link for communicating with the equipment downstream in the installation.

The invention further provides that the device is fitted for modifying the driving of the at least one power electric load according to at least one information related to the functional status of the at least one power electric load and/or of resources associated with it. It is provided for example that at least partial knowledge of the operating cycle of the at least one power load driven by the device according to the invention and/or at least one status information such as a temperature and/or, where appropriate, knowledge of the status of storage or energy production reserve means associated with the at least one driven load, allows the device to optimize its driving. Optimization of driving consists for example in giving anticipated priority access to the power for a power load producing cold whose temperature exceeds the upper temperature setpoint. This may for example be shifting the implementation of latent or effective power shedding to the end of the washing cycle of a household apparatus having started before the reception of the at least one setpoint or implementing effective shedding in the form of the lowering of the washing temperature, etc.

It is provided that the device according to the invention further comprises means for limiting the power consumed in the terminal electrical installation by appropriate driving of the at least one power electric load. This variant manages the at least one power load in such a way that the overall power consumed by the installation is maintained for a given time below a limit. The length of time and the value of the power limit are determined by the reception of the at least one setpoint according to all the variants of the invention. This is particularly advantageous in that the shedding management of the at least one information system that drives the entire system is simplified for each relevant terminal electrical installation. Indeed, limitation of access to power and the effective reduction of power consumed are controlled on a consolidated basis involving all loads, even those that are not driven by the device according to the invention. The device then dynamically drives loads for the duration of the limitation for continuously maintaining the overall power under the imposed limit which implies possible actions on the status of the driven load with a downward or upward effect depending on any event affecting the general consumption of the installation. Information on the overall power consumed by the terminal installation is obtained for example by using the energy meter of the installation as described earlier or using measuring means comprised in the device having a current sensor capable of measuring the current flowing in one out of two drivers of the single-phase installation from the meter, preferably the cable phase. According to the implementation variants of the invention, the device may for example proceed with simulations prior to any action on the at least one load in response to an excess measured power. These prior simulations aim to determine beforehand the appropriate actions on the controlled loads so as not to exceed the imposed limit. Another implementation variant of the invention consists in immediately switching off all power loads controlled when the authorized power is exceeded, then in switching back on each load at the level of power required so as not to exceed the limit imposed, taking account, where appropriate, priority rules governing access to the power according to uses or the thermal inertia of apparatuses, residual power sharing rules between equivalent priority loads. Such sharing rules are for example by rotation of access periods to the power when loads only provide an operating mode at the nominal power or by simultaneous sharing of the available power when loads offer reduced power operational modes.

It is provided that the device according to the invention further comprises means for transmitting at least one command from an external apparatus to the at least one power load in the absence of power limitation and/or reduction. These means are input interfaces designed to receive the outputs of at least one external control device. The at least one power load driven by the device is by nature often at least one heating or cooling apparatus requiring control by a programmer, a thermal regulator, a remote control receiver or any other home automation system or technical management of the building. The device according to the invention provides for at least one input to be connected to the output of an optional external control device which, in the absence of limitation or reduction of power according to the invention, imposes the status of its choice to the at least one appropriate load to be driven. In case of the need for action of the device on the at least one driven load in the framework of the invention, the signal produced by the external control apparatus is ignored and the device imposes the status of its choice on the at least one power load in an unconditional and priority way. The interfaces proposed as inputs are usually of the same nature as the corresponding outputs for driving the at least one load, for example "pilot wire". Control devices and the at least one load pre-exist and cooperate frequently before the installation of the device according to the invention which makes it advantageous to only have to interpose the device in the pre-existing link to make all equipment interoperable. However there is no distancing from the framework of the invention if the input and output interfaces are of a different nature and the device plays a gateway role ensuring the functional continuity between equipment that is not directly compatible.

It is expected that the device according to the invention further comprises means for allowing the user to derogate the effect of the reception of the at least one setpoint. It is commonly found that a restrictive system, even if its implementation gives rise to economic compensation, is better accepted by its users if they know that they have the possibility of imposing their will as a priority on the automations. Control means are thus provided in devices according to the invention for making them insensitive to the received setpoints and/or for cancelling the effect a posteriori. The offer of a derogated operating mode is advantageously completed by a delay time or any other means for automatic release from it to return to a normal operation mode where the device is capable of receiving the at least one setpoint according to the invention. In certain sophisticated implementation variations of the device according to the invention, it is provided to manage a "derogation package" for example expressed as a number of shedding setpoints ignored by the device in a given period of time, for example 5 derogation permissions at most over 30 sliding days. Whenever the user requests a manual overriding of access to power, this action is taken into account by the device as long as the package is not exhausted. The package is automatically reloaded. This allows the offering of a derogation capacity appreciated by users while limiting the risk of abusive use without complicating management in terms of the information systems involved. A more elaborate variant is provided whereby the user asks their operator for a derogation for example through a smartphone, tablet or website application. The information system takes this into account where appropriate in the management of the associated customer account and sends a shedding disabling setpoint to the relevant at least one device of this customer by using the downlink transmission system with an individual addressing capacity for transmitting shedding setpoints. In the case of a bidirectional end-to-end transmission system, the derogation request is advantageously transmitted from the device according to the invention that can also conceal the latency times of the management and communications system in the eyes of users by immediately starting to give the appearance of access to power by enabling functions that consume little power but are visible such as those dependent on the human-machine interface of the system according to the invention. Effective access to power for the relevant at least one power load is authorized by the device silently when the appropriate setpoint is received.

According to another aspect of the invention, a system is provided for reducing electric power, likely to be consumed and/or actually consumed, by the at least one power load in a terminal installation of an electrical network.

The system according to the invention comprises a driving device according to the invention and at least one driven power electric load. It is provided that the system takes the form of at least two separate apparatuses, the control apparatus that constitutes the driving device according to the invention and at least one apparatus representing a power load.

It is provided that the at least one power load comprises at least one power load used in the framework of the provision of the same service or within a same product, for example the compressor and the armored resistor in a thermodynamic water heater. Another example of the same type of the at least one power load within a single appliance driven by the device is the flat resistor of a radiant panel and the armored resistors immersed in a phase-change material of a thermal energy storage block within the same storage heater.

It is also provided in a preferred variant of the invention in which the device integrates a driving function of the at least one power load aimed at limiting the total power of the installation under a power threshold imposed for a given time, by the reception of the at least one setpoint according to the invention. In this variant, the at least one power load represents at least one apparatus whose unit consumption is significant, for example at least 500 W. It is provided that the device drives a plurality of power apparatuses of all categories by appropriate interfaces according to the apparatuses, for example by direct switching of the supply for an electric water heater, by pilot wire for electric heaters, by radio remote control with infrared transmitter at the point of reception, etc.

It is also provided that the system comprises at least one apparatus in the same casing, the driving device according to the invention and at least one power electric load. The functional link between the device according to the invention and the at least one power load is for example provided by the electrical connection of the standard supply cables of the apparatus at the output of the device if it incorporates switching power means or an external power relay controlled by the device according to the invention. For example, this type of functional link is appropriate for driving an electric water heater by Joule effect or any other simple load.

The functional link between the device and the at least one power load can also be based on a "pilot wire" link which is particularly appropriate in the case of electrical heating or cooling apparatuses. It is also provided that the functional link between the driving device according to the invention and the driven load is done via a remote control by radio frequency, PLC or infrared. Devices such as air conditioners natively incorporate a remote control receiver that it is advantageous to use to also receive commands transmitted by the device according to the invention. In this case, the at least one power load is connected to the electrical network through at least one remote control receiver, integrated or not in the same casing, which is remotely controlled by the device according to the invention within the building. The implementation variant in the form of a separate driving device is particularly appropriate for the renovation of an existing installation already including power apparatuses. The implementation in the form of an appliance with integrated driving according to the invention tends to target new apparatuses optimized to best operate the invention for example by taking into account information in connection with the operating cycle or the status of the apparatus.

It is provided that the system according to the invention forms an apparatus for producing sanitary hot water. For example a Joule effect water heater, a thermodynamic water heater or a mixed source water heater.

It is also provided that the system according to the invention forms a heating and/or cooling apparatus. For example, a thermodynamic boiler producing heat and sanitary hot water, a heater, a reversible or non-reversible air conditioner.

It is provided that the system according to the invention further comprises means for locally storing energy to compensate fully or partly for insufficient production of energy in the electrical network so as to ensure that the service provided by the at least one driven load is not noticeably disturbed for users. These means of storage, according to the implementation variants of the invention, are integrated in the same casing as other components of the system, or proposed in the form of external and/or optional accessories. Their main effect is to be able to extend shedding periods without impacting users. Depending on the type of apparatus, it can for example be heat or cold storage in solid or phase-change materials, electricity storage, mechanical storage. It can for example be an external tank or tank integrated in the casing comprising the at least one driven power load, the tank having an appropriate volume and preferably containing phase-change materials capable of effectively storing heat or cold in the form of latent heat. Local means of energy storage, in the form of electrical loads in super-capacities, in chemical form in accumulators or in mechanical form in flywheels or in the form of a compressed gas, are also provided with their respective appropriate means for the restitution of stored energy.

It is provided that the system according to the invention is fitted for receiving energy produced by local means to fully or partly offset insufficient production of energy in the electrical network so as to ensure that the service provided by the at least one driven load is not disturbed noticeably for users. It is for example by means of thermal energy production such as solar panels with extraction of the energy produced by a heat transfer fluid circulation, by means of electricity production such as solar panels or a wind turbine not connected to the electrical network, or by such means of local energy generation, connectable to the electrical network in normal conditions but automatically controlled to switch to local self-production in the case of insufficient power supplied by the electrical network. The use of any other means of intermittent production of thermal or electrical energy to fully or partly offset insufficient power from the electrical network is provided in the invention.

According to another aspect of the invention, a method is provided to operate a plurality of systems according to the invention in an electrical network.

The method according to the invention comprises the steps of:

Continuous monitoring of the balance between electricity consumption and production in said electrical network by an appropriate supervision and management system;

Transmission by said appropriate supervision and management system to a determined plurality of systems according to the invention, of at least one setpoint for adjusting consumption of electricity to production by reducing demand for electric power in the case of a given deficit production.

It is provided in a particularly refined variant of the method to take advantage of the addressing capability of the remote control system, and/or where appropriate, of the transmission of setpoints differentiated in terms of the amount of power to be shed in latent or effective mode to best approach the perfect balance between consumption and production.

The method according to the invention further comprises the step of:
  Storing, in at least one information system, of at least one information related to the transmission by said appropriate supervisory and management system, to a determined plurality of systems according to the invention, of at least one setpoint for adjusting the consumption of electricity to production by reducing electric power demand.

The method according to the invention provides for example the saving in a database of the identification of installations comprising at least one system according to the invention to which the setpoints are transmitted, predetermined amounts of electric power associated with the setpoints, the number of systems according to the invention comprised in each installation and, where appropriate, their respective nominal powers, as well as the timestamping of the transmission of setpoints. All or part of this information allows that appropriate accounting and, where appropriate, compensations between the operators involved, are carried out in a timely manner in accordance with given rules of economic valuation, and where appropriate contractual rules. Saving of this information also provides traceability of the actions taken.

The method according to the invention further comprises the step of:
  Accounting in the at least one information system, of the amount of energy consumption that has been avoided in an installation where at least one system according to the invention is implemented.

The method according to the invention provides, for example, that appropriate accounting and, where appropriate, compensations between a plurality of operators involved, is carried out in the at least one information system implemented. Accounting of the amount of energy consumption avoided is the basis of the application of economic models and the implementation of the regulatory constraints applicable in appropriate software in the framework of automatic or semi-automatic management of the electrical network involving a plurality of stakeholders.

The method according to the invention further comprises the step of:
  Differentiated accounting, in the at least one information system, of the amount of energy consumption avoided, depending on whether the at least one power electric load is ON or OFF when the at least one setpoint is received by the device driving it.

The method according to the invention thus provides for the possibility of applying different values of economic valuation of the amounts of shed energy and, where appropriate, using separate economic models and/or applying separate regulatory constraints, depending on whether consumption shedding according to the invention is latent or effective.

The method according to the invention further comprises the step of:
  Derogation request.

This step is advantageously implemented in the invention for enhancing the attractiveness of a service offer in connection with energy shedding. Where access to power has been limited or the power consumed by a system according to the invention has been reduced, the implementation of this step consists for the user in formulating an overall derogation request or targeting one or more systems according to the invention by any means at their disposal. For example, in some implementation variants, this derogation request is proposed by a physical action on the system or the device in question. In other implementation variants, the derogation request may be transmitted to the at least one information system capable of taking charge of it through an application executed by a smartphone, a phablet or a tablet or through an appropriate web portal accessible by any standard means. Identification of the apparatus in question, where appropriate, can advantageously use means such as an NFC label or barcode. The label is integrated into the system according to the invention and may be read by a smartphone, phablet or tablet. Variants relying on connection to a server capable of directly recognizing vocal requests are also provided. The use of means such as smartphones or equivalent are particularly advantageous as they allow direct access to the relevant information system, direct identification or even authentication of the user, automatic reconciliation of their customer account, appropriate action, when necessary, on at least one of their accounts and for ultimately acting on the systems according to the invention in order to cancel or postpone the effect of the reception of the at least one setpoint. The use of means of information and communication technologies allows the reduction of the bandwidth used and, where appropriate, sole use of a downlink transmission between the at least one information system in question and the terminal installation of the customer.

Applying the method according to the invention is provided for managing an electrical network comprising energy sources having intermittent production whose contributions are impossible to plan reliably such as wind turbines, solar panels, solar power plants where electricity is generated by thermodynamic means, etc.

It is provided to apply the method according to the invention in the framework of an electrical energy consumption reduction management service.

This service can for example take the form of an electrical energy shedding aggregation service in the case of a production deficit or incident in the network. The aim is to organize and manage a shedding capacity comprising a plurality of systems according to the invention, to use it by implementing the method according to the invention in order to offset production deficit liable to unbalance an electricity network for reselling energy whose production was avoided to a network manager.

It is provided to apply the method according to the invention for supplementing a service supplying sanitary hot water and/or heating and/or cooling and/or electricity supply. This is for example, for a provider of services such as the installation and maintenance of thermal equipment or individual or collective energy production, in the framework of rental contracts to end-users, the exploitation of the park of installations thus constituted for generating additional revenue by selling consolidated shedding services based on the aggregation of diffuse shedding to stakeholders in the management of the electricity network.

It is provided to implement the invention in domestic, business or industrial premises in the form of individual or collective installations.

BRIEF DESCRIPTION OF THE DRAWINGS

Other features and advantages of the invention will appear on examining the detailed description of implementation modes, which are in no way limiting, and appended drawings.

DETAILED DESCRIPTION OF FIGURES AND EMBODIMENTS

Figure 1:
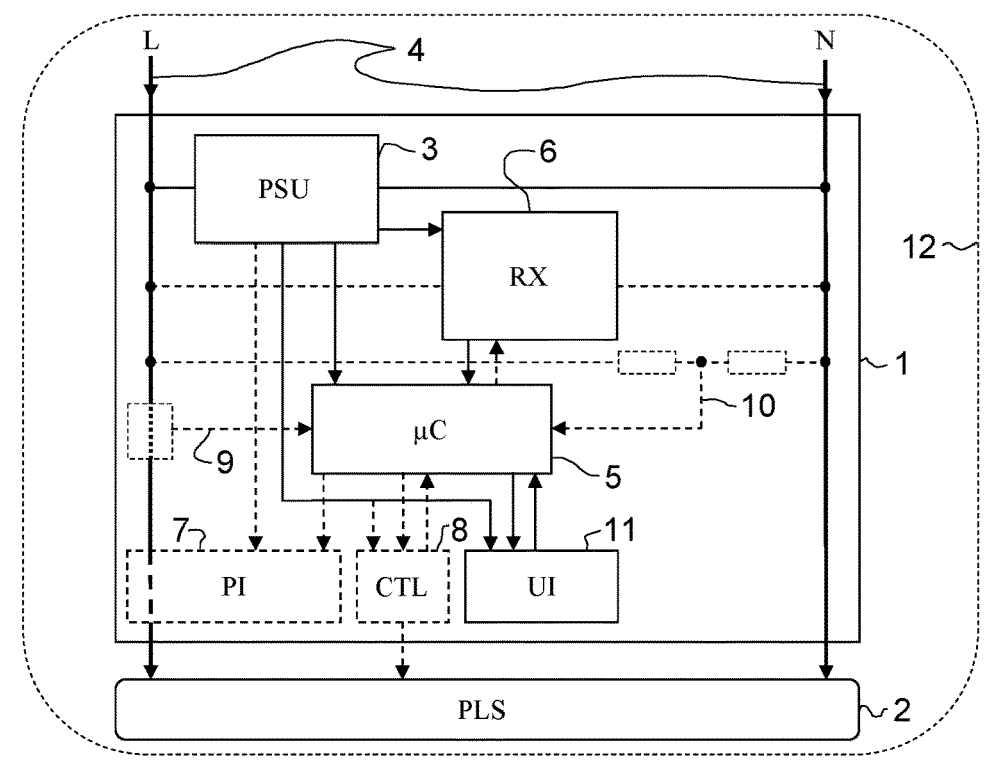
FIG. 1 illustrates a first variant of the block diagram of the device.

Other specific features and advantages of the invention will appear in the description below. In appended drawings given as non-limiting examples:

FIG. 1 illustrates a first variant of the block diagram of the system. The block diagram of a system 12 comprises a device 1 according to the invention for driving at least one power electric load 2. Device 1 comprises a low voltage power supply subassembly 3 providing the voltage required for the operation of the other subassemblies from the voltage of the electrical installation 4 to which it is connected. At the heart of the device is the microcontroller 5 which controls the resources of the device through software contained in its program memory, a working RAM memory and a non-volatile memory for permanent storage of operating settings and functional statuses, where appropriate. Models of the "tiny" 8 bit AVR microcontroller family from Atmel, registered trademarks, or models of the "MSP430" 16 bit microcontroller family from Texas Instruments, registered trademarks, are particularly preferred, but several other acceptable references are also available at other semiconductor manufacturers. A communication subassembly 6 ensures at least the reception of the setpoint which triggers the supply of a predetermined amount of electrical energy. The use of all types of physical media and communication protocol is provided in the framework of the invention. It is also provided to use a transceiver capable of receiving and transmitting information to make the device compatible with certain telecommunications standards requiring bidirectional exchanges. When the at least one power electric load 2 is an electric load not comprising power switching means or not comprising an interface enabling the device 1 for its remote control, switching means are integrated into a power interface 7. The power interface 7 comprises for example at least one electromechanical or static power relay and its control electronics. Otherwise, the power from the electrical network, via the means for measuring the current, where appropriate, is supplied directly to the at least one power load 2. It is also provided that at least one subassembly of driven power can be remote controlled by the device via any conventional unidirectional or bidirectional control means 8. The control means 8 communicate with the at least one power load 2 for example by "pilot wire", power-lines, radio frequency, infrared or by any wire means. This allows use of power switching means external to the device which are already implemented in driven apparatuses, for example for controlling the at least one power electric load or for regulating its temperature. In addition, when the device according to the invention does not comprise means for measuring the electric power supplied, it is provided to acquire a signal in relation to the supply voltage of the power load. This refinement makes it possible to modulate the time calculation determining the amount of shed energy depending on the variations of the network voltage around its nominal value which is 230 V in Europe and 110 V in North America. The modulation of the time calculation is for example the application of the same law of proportionality based on delay time centered on its nominal value as that measured on the network voltage centered on its nominal value. It is also provided that the correction is made from tables of values stored in a memory. Thus the amount of shed energy is more rigorously calculated taking into account the actual electrical supply conditions as would be the case in the reverse framework of supplying a predetermined amount of energy.

According to implemented variants for estimating or measuring the power of the at least one power load 2 in one or more operation modes for subsequently quantifying the shedding according to the invention, the device comprises means 9 for knowing the current flowing in the at least one power electric load 2 and/or means 10 for knowing its supply voltage. Depending on the framework of implementation, the means 10 collect voltage information at the most relevant place. For example at the main power supply from the electrical installation 4 as in FIG. 1 or directly at the terminals of the power loads within the block 2.

In the diagram of FIG. 1, the same microcontroller 5 is provided to implement all aspects of the invention including for measuring the power consumed by the at least one power electric load 2, where appropriate. Of course the skilled person in the art will understand that all the well-known solutions for measuring power or electrical energy relying or not on the use of specialized integrated external circuits for metrology, for example using a shunt for measuring current, a current transformer, a Hall-effect sensor, a Néel-effect sensor or a Rogowski coil sensor, can also be used without departing from the scope of the invention.

A user interface 11 comprising at least one push button and one light indicator allows interaction between the device and the user. Where appropriate, the user interface comprises the appropriate commands for providing the user with the possibility of derogating from automations for example by manually overriding access to the power and making the device insensitive to any shedding setpoints for a determined time.

When systems according to the invention comprise means for storing energy, "gauge" information means for knowing the relative amount of energy stored allow the device according to the invention to manage shedding more precisely with the aim of making it as imperceptible as possible to the user. Information from the "gauge" can also be advantageously made available to the user by any appropriate display means.

Figure 2:
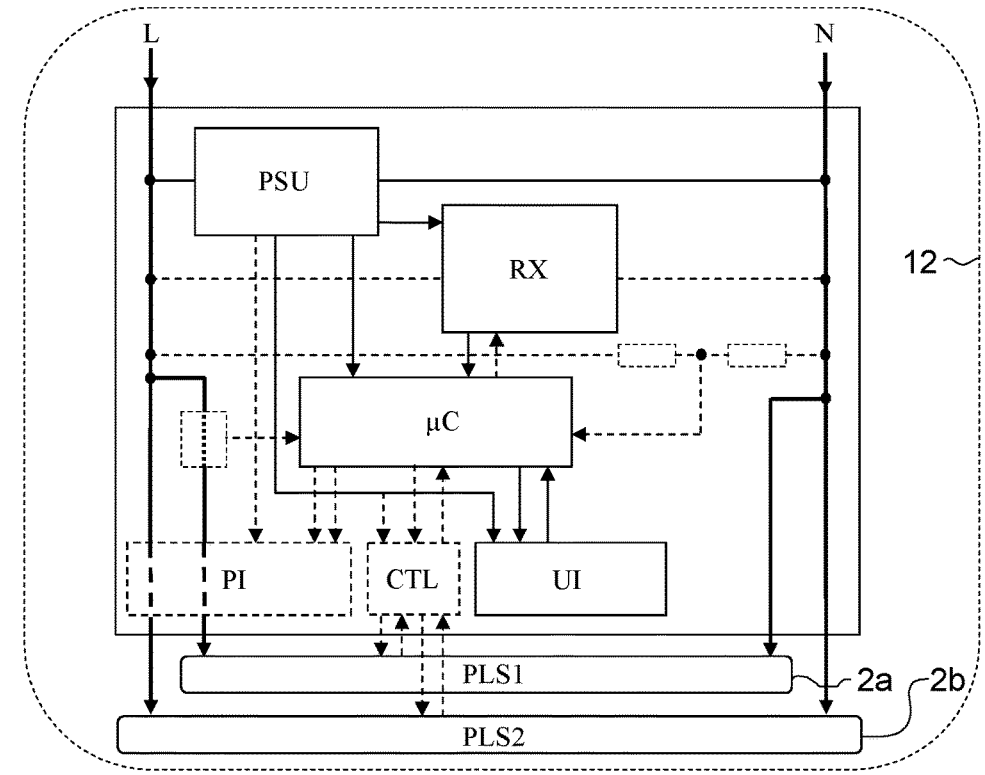
FIG. 2 illustrates a second variant of the block diagram of the device.

FIG. 2 illustrates a second variant of the block diagram of the system.

This figure differs from the previous one in that it comprises two at least one power electric loads 2a and 2b controlled separately. This variant corresponds to the case of a system 12 according to the invention forming an apparatus which for example is fitted to provide energy storage capacity in a first consumption mode and a traditional operation in a second consumption mode. The device according to the invention manages the reception of a shedding setpoint by involving a group of loads or both depending, for example, on an implementation choice of the invention, the amount of power to be shed, the amount of energy stored in the system at the time the setpoint is received, a temperature, the impact of shedding on the user, etc.

This block diagram corresponds for example to a heating or cooling apparatus comprising a transformation subassembly with energy storage plus a traditional subassembly immediately supplying heat or cold without storage. For example, a heater with an immediate action traditional radiant panel to which a storage capacity is added for deferred use of the stored heat. Another example is an air conditioner containing in the same apparatus a subassembly capable of providing immediate service by high energy efficient thermodynamic means and a thermal heat and/or cold storage subassembly. It is also provided that some or all of the power subassemblies, especially the one that is intended to provide immediate service, are remote-controlled by the device via any conventional means, for example by "pilot wire" or wireless remote control means.

Figure 3:
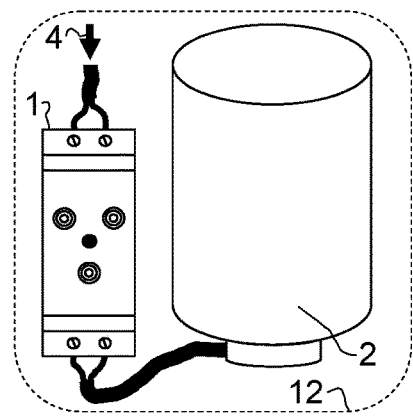
FIG. 3 illustrates a first variant of the system in separate elements.

FIG. 3 illustrates a first variant of the system in separate elements. The system according to the invention 12 is implemented in the form of two separate apparatuses, the device according to the invention 1 and the at least one power electric load 2. The system according to the invention in this example forms a production system for storage of sanitary hot water. The device according to the invention 1 is connected to the electrical network 4 and the at least one power electric load 2. The at least one power electric load 2 comprises in this example an electric resistor or thermodynamic heating means and a thermostat regulating the temperature of the water as well as, where appropriate, a separate safety thermostat. This apparatus naturally comprises means for locally storing energy, in this case in the form of heat, to fully or partly offset insufficient production of energy in the electrical network at a given time. The means for locally storing energy, in this case in the form of heat, are in this example a tank comprising a volume of water.

Figure 4:
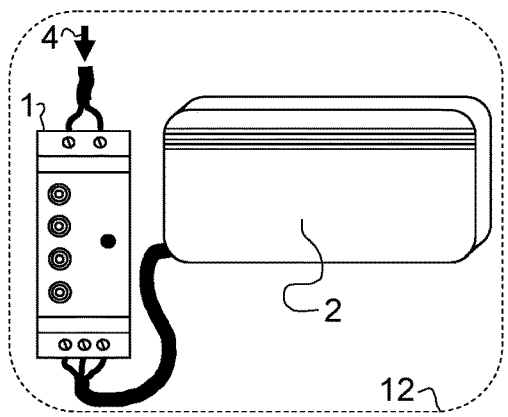
FIG. 4 illustrates a second variant of the system in separate elements.

FIG. 4 illustrates a second variant of the system in separate elements.

The system according to the invention 12 is implemented in the form of two separate apparatuses 1, 2. The system according to the invention in this example forms an electric heater. The device according to the invention 1 is connected to the electrical network 4 and the at least one power electric load 2. The at least one power electric load 2 comprises in this example an electric resistor and a thermostat regulating the temperature, as well as, where appropriate, a separate safety thermostat.

Figure 5:
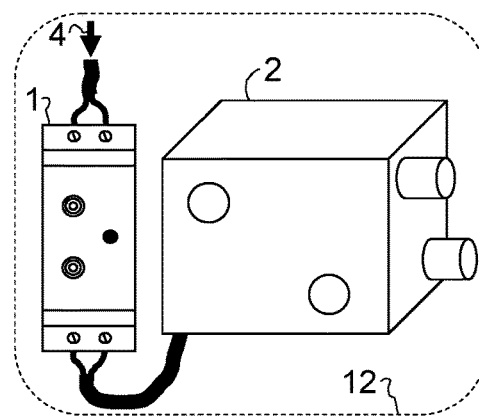
FIG. 5 illustrates a third variant of the system in separate elements.

FIG. 5 illustrates a third variant of the system in separate elements. The system according to the invention 12 is implemented in the form of two separate apparatuses 1, 2. The system according to the invention in this example forms a "forced draft" ventilation or "turbofan" system. These active ventilation systems designed for the renewal of the air inside buildings are characterized in that fresh air is drawn from the outside and distributed inside the premises. These ventilation systems comprise electrical means for heating or preheating the air distributed in the premises. The device according to the invention 1 is connected to the electrical network 4 and the at least one power electric load 2. The subassembly 2 comprises in this example an electric resistor and a thermostat regulating the temperature, as well as, where appropriate, a separate safety thermostat.

Figure 6:
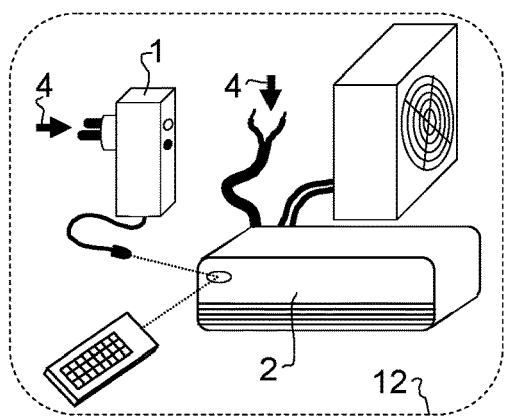
FIG. 6 illustrates a fourth variant of the system in separate elements.

FIG. 6 illustrates a fourth variant of the system in separate elements.

The system according to the invention 12 is implemented in the form of two separate apparatuses 1, 2. The system according to the invention in this example forms an air conditioning system according to two variants, cooling only and reversible. In this implementation example, the invention uses the ability of the load to be remote controlled by infrared signals for simplifying the functional connection between the device 1 and the at least one power electric load 2. The at least one power electric load 2 in this example comprises a compressor unit, a control and regulation subassembly remote-controlled by infrared signals. The device according to the invention 1 and the at least one power load 2 are separately connected to the electrical network 4. The device 1 is provided in the form of a jack-housing fitted with an infrared signal transmitter. The infrared signal transmitter according to the implementation variants is fitted into the housing in the form of an IR blaster or in the form of a wired extension comprising an infrared signal transmitter to be pointed in the appropriate direction to reach the receiver directly or by reflection.

Figure 7:
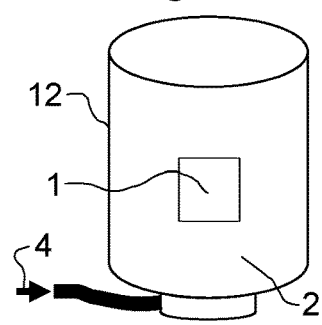
FIG. 7 illustrates a first integrated variant of the system.

FIG. 7 illustrates a first integrated variant of the system.

This example of the system according to the invention 12 differs from that of FIG. 3 in that it takes the form of a unique apparatus according to the invention, in this case, a storage domestic water heater, in which the device 1 and the at least one power electric load 2 are integrated in the same casing. The apparatus 12 is connected directly to the electrical network 4.

Figure 8:
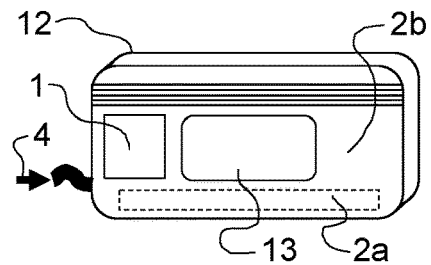
FIG. 8 illustrates a second integrated variant of the system.

FIG. 8 illustrates a first integrated variant of the system.

This example of the system according to the invention 12 differs from that of FIG. 4 in that it comprises means for locally storing energy 13 and takes the form of a unique apparatus according to the invention, in this case a storage or mixed heater, i.e. for storage and instant heating. The apparatus 12 is directly connected to the electrical network 4. It comprises the device 1 and the at least one power electric load in the form of two separate groups of heating resistors 2a, 2b separately controlled by the embedded device 1. In this variant, an instant heating subassembly 2b, for example by convection, by a resistive radiant panel or by infrared, operates alongside a storage heat production subassembly.

The means for locally storing energy 13, in this case in heat form, are here a solid material volume and/or phase-change material in a suitable casing, completed by means for extracting and delivering the stored heat.

Figure 9:
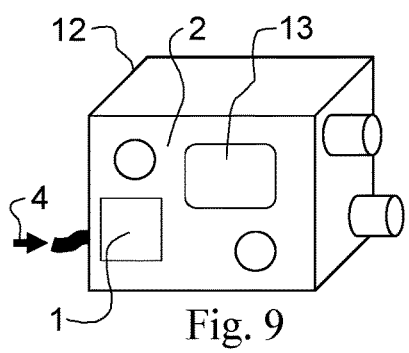
FIG. 9 illustrates a third integrated variant of the system.

FIG. 9 illustrates a first integrated variant of the system.

This example of the system according to the invention 12 differs from that of FIG. 5 in that it takes the form of a unique apparatus according to the invention, in this case a centralized mechanical ventilation apparatus comprising heating means and means for locally storing energy 13 in heat form. The device 1, the at least one power electric load 2 and the means for locally storing energy 13 are integrated in the same casing, the apparatus 12 thus formed being connected to the electrical network 4.

Figure 10:
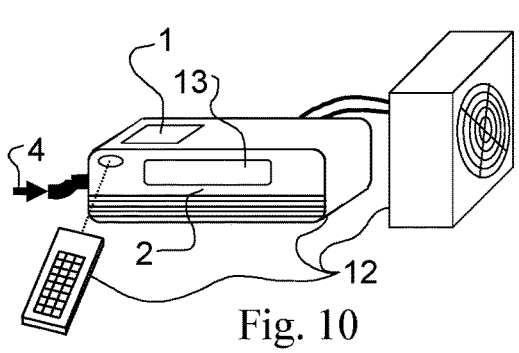
FIG. 10 illustrates a fourth integrated variant of the system.

FIG. 10 illustrates a first integrated variant of the system.

This example of the system according to the invention 12 differs from that of FIG. 6 in that it takes the form of a unique apparatus according to the invention, in this case an air-conditioning apparatus with cold and/or heat storage.

The device 1, the at least one power electric load 2 and the means for locally storing energy 13 are integrated in the same casing, the device 12 thus formed being connected to the electrical network 4.

Figure 11:
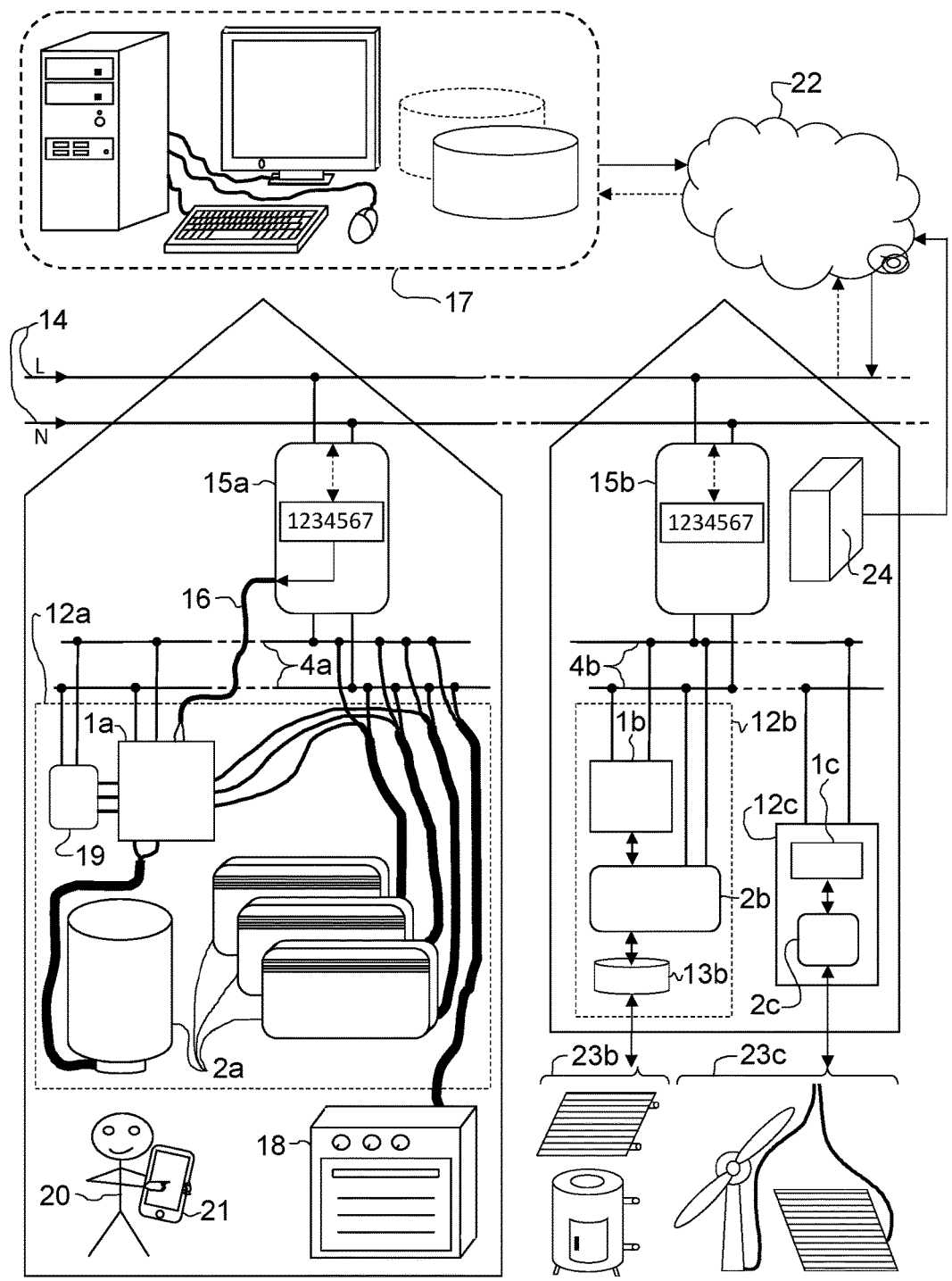
FIG. 11 illustrates an example of implementation of the invention.

FIG. 11 illustrates an example of implementation of the invention.

This example illustrates the implementation of the invention in an electrical network 14 serving a plurality of terminal systems 4a, 4b. The meters 15a, 15b define the upstream and downstream portions of the electrical network. The terminal electrical installation 4a comprises a device 1a in a particularly preferred variant. This example is a device adapted to the technical specificities of the French electrical network, the skilled person in the art will know how to adapt these solutions to the specific characteristics of electrical networks in other countries. The device 1a includes means for receiving, decoding and interpreting a standardized composite information stream supplied by the electronic meter by means of a suitable connection 16. This interface is a "customer remote information" output which is available on all electronic meters. This is a two-wire link where the information is organized in cyclic and coded frames from an ASK modulation of a carrier frequency of 50 kHz. The device 1a further comprises means for directly receiving TCFM (ripple control) type remote control orders which are transmitted by very low speed power lines using a carrier frequency of 175 Hz. The device 1a also comprises means for decoding information received by the "customer remote information" output of the meter according to the method described in patent FR1301944 for routing specific remote controls from the management information system of the electrical network to recipient terminal installations using only standard means compliant with their original specifications. Thus equipped, the device 1a can be installed throughout the country, both in areas where TCFM (ripple control) type solutions are used for tariff management and in areas where "Linky" (registered trademark of ERDF) solutions will have replaced them. The device 1a comprises means for driving the at least one power load 2a which in this implementation example is a plurality of apparatuses whose unit power is greater than or equal to 500 W. The device 1a comprises interfaces adapted to the apparatuses to be driven. As this variant of the device according to the invention particularly targets installations where sanitary hot water and heating are produced by electrical energy, the device includes a relay for driving the supply of the electric water heater and several types of "pilot wire" outputs for driving standard electric heaters. The more individually-driven loads there are, the more precise is the setting, the greater are the opportunities for approaching the limit power and thus the less the user is impacted by the shedding. In excess of 5 outputs, power load driving solutions by bus, radio link or PLC are preferred for increasing the number of individually drivable loads without complicating the installation. The variant 1a further comprises means for limiting power consumed in the terminal electrical installation by appropriate driving of the at least one power electric load. These means are enabled by the device for a given time and with a given power limit not to be exceeded when at least one setpoint of the invention is received. Normally, the consumption of all apparatuses of the terminal installation 4a is within the limits determined by the supply contract of the operator and follows recurrent provisions provided in the subscribed tariff conditions. The same means as those implemented for limiting or reducing the power consumed by an electrical installation are indeed likely to be used in normal conditions, i.e. in the absence of shedding according to the invention, for driving the apparatuses as laid down in the subscribed tariff offer. For example for driving the at least one load in advantageous conditions for the customer according to tariff levels and the tariff periods such as for example off-peak and peak hours, and mobile power peaks where appropriate. When the at least one setpoint according to the invention is received by the device 1a, the latter changes its operation settings to limit the maximum power consumed by the installation based on the new value imposed by the at least one setpoint for a length of time, itself determined, before automatically returning to the initial conditions of the contract when this time has elapsed. One of the advantages of the invention is to simplify shedding management for the operators of services involved. Thus, the at least one setpoint according to the invention is advantageously associated with commands involving simple IT processing in the information systems of managers 17. For example, a command whose meaning for the transmitter system and receiving devices is to "limit the consumption of the terminal installation to 50% of the subscribed intensity for 10 minutes". A setpoint of this type, which is relative in terms of power or intensity, is simple to be processed in the information system of the manager which has all the attributes of the contract related to the installation in its database and can thus make all calculations necessary for operating the network, by estimating in advance the cumulative power released by consumption shedding of foreseen recipient installations before transmitting the setpoints. The relevant operator of services can also simply credit the account of the customer according to the remuneration model associated with shedding, knowing the transmitted setpoint, time-stamping of its transmission and the intensity subscribed by the customer. The use of such a setpoint by the device is also very simple, a delay time is enabled on reception, whose count can advantageously be modulated according to the variation of the network voltage around its nominal value and means for limiting the power in the installation are implemented with the new value of power or maximum intensity not to be exceeded. This information is calculated on the basis of the intensity subscribed which is communicated by the meter to the device. Similarly, the meter communicates to the device the continuously updated instant intensity. It is provided in the invention to work indifferently on the basis of intensities and/or powers. When it is necessary to move from one measurable quantity to another, depending on the context, the power being the product of the intensity by the voltage for measurable quantities of the same type (efficient, apparent etc.), the appropriate factor will be used. For example the value of the effective voltage measured by the meter or the device, the nominal value of the voltage of the network or another constant value. Other types of setpoint are provided in the framework of the invention, for example "limit access to power at the rate of X KWh" (arbitration on the duration of the shedding time and the shedding power being left to the discretion of the device and the possible choice of the user), "limit access to power for X minutes at a rate of Y KWh", etc. Indirectly quantifying the power or intensity to be reduced into an energy unit further facilitates the valuation calculations of managers and operators as they can completely ignore the technical features of the installations and loads they contain. With operating setpoints expressed as a unit of energy, the device calculates the shedding time, if it is not directly defined by the setpoint or by a related setting value. The device also calculates the value of the power limit imposed by the reception of the setpoint on the basis of available information.

The limitation of the power consumed in the installation at the value imposed by the reception of the at least one setpoint during shedding times or the power subscribed in normal use, is based on appropriate ON and OFF mechanisms of each load that can be controlled by the device. Thus in case of exceeding the limit value found in the information received from the meter, the difference between the limit value not to be exceeded and the current value is calculated. All or part of the apparatuses driven by the device are switched OFF, or, when appropriate, left ON but at reduced power to bring overall consumption of the installation below the imposed limit. The invention provides for many load driving refinements and strategies aimed at optimizing the service provided to the user to make the reduction of power as unobtrusive as possible to the user.

The invention, although in most cases it controls a limited number of power loads, nevertheless offers a wide adjustment dynamic with respect to excess consumption caused by the switching ON of loads not controlled but nevertheless involved in the general consumption of the installation. A device according to the invention is advantageous for the user even outside the issues of consumption shedding in that it is used for reducing to the strict minimum necessary the power subscribed of at least one segment of 3 kW or even two in a residential installation without noticeably reducing comfort. This is explained by the fact that it is no longer necessary to apply safety factors to avoid untimely outages due to exceeding the subscribed intensity. For example, whether in normal periods or after reception of a setpoint according to the invention with the effect of reducing the maximum authorized power in the installation, when the oven 18 switched on in the installation 4a causes excess use of the maximum authorized power, the device automatically reestablishes the situation by stopping the apparatuses or reducing their operating power as necessary. In practice, to reduce the risk of outages in heavily loaded installations with regard to the intensity subscribed, the device will strengthen the impact of its action by instantly switching OFF all controlled loads as soon as the excess use is observed then switch the loads progressively on, when possible, at their optimal power, preferably according to natural priorities depending on uses or inertia of the apparatuses then will share the remaining capacity, where appropriate, at the last level of priority by setting up rotations or appropriate reduced power.

Device 1a further comprises an interface designed to be connected to one or more upstream management, remote controlled or programmed apparatuses 19 whose orders to the at least one power load controlled by the device should be transmitted in a normal situation and pre-empted by the device in the case of excess use of power requiring its priority control. In the example of device 1a, there will be as many "pilot wire" inputs as there are corresponding outputs. Functional continuity between each input and corresponding output is provided in normal operation. The device takes control of relevant outputs to act in priority and appropriately on power loads in the case of exceeding the imposed power limit or where appropriate in normal situations in the case of a priority action relevant to the subscribed conditions, for example override setting in frost guard mode or economic mode during mobile power peaks or on "red days" of the Tempo tariff (registered trademark of EDF).

The user 20 can use any means of communication at their disposal, such as a smartphone, a phablet or a tablet 21 connected directly to Internet 22 via a cellular network or indirectly via a "box" by WiFi, to ask the at least one information system in question 17 to derogate from the effect of a received setpoint according to the invention. In this example, the resulting setpoint resulting in the cancellation of shedding is transmitted back by the same channel as used to transmit the at least one setpoint according to the invention.

The terminal installation 4b comprises two systems according to the invention 12b and 12c. System 12b comprises, in the form of two separate apparatuses, the device according to the invention 1b which drives the at least one power load 2b via an appropriate control interface. The system 12b further comprises thermal storage means 13b which can extend the shedding time without disrupting users. The thermal storage means 13b allow the benefit of the energy input of local energy production means 23b which reduces the need for extracting electric power from the network. In this example, local energy production means are thermal. The energy they produce is extracted, transported then transferred in storage means 13b by the circulation of a heat transfer fluid appropriately controlled according to the characteristics of the system and its installation.

The system 12c comprises, in the same case, in the form of a unique apparatus capable of forming, for example, a thermodynamic electric boiler, the device according to the invention 1c and the at least one power load 2c. The system 12c further benefits from the energy input of local production means 23c which reduces the need for extracting electric power from the network. In this example the local energy production means are electric, operating in self-sufficiency.

In the terminal electrical installation 4b, the setpoints are transmitted through a "box" 24 acting as gateway between the at least one information system 17 and the devices according to the invention of the installation 1b and 1c which include appropriate means of reception of setpoints. The meter 15b of the installation 4b is not directly part of the implementation of the invention in this example. The meter 15b, if it is communicating, can advantageously be operated indirectly through the load curves that it transmits to the at least one information system 17. This information is used to verify the effectiveness of the shedding as well as any possible fraud. It is worth noting that the number of devices according to the invention present in every terminal installation must be known to the at least one information system managing the method. All the devices capable of simultaneously receiving the at least one setpoint in the same installation add their respective contributions in terms of amounts of power and energy which can be reduced.

Figure 12:
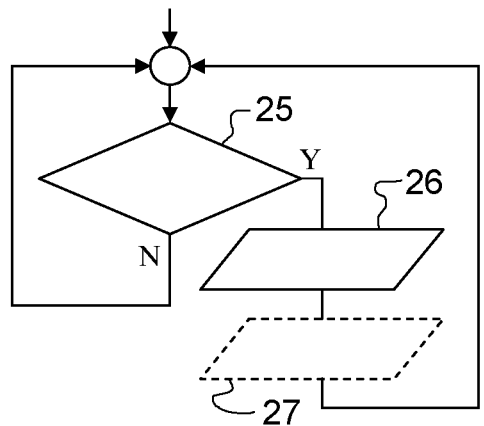
FIG. 12 illustrates the steps of the method related to the balance of the network.

FIG. 12 illustrates the steps of the method for producing actions allowing the implementation of the invention in terms of balancing energy production and demand in an electrical network by acting on demand. In the framework of continuous monitoring of the balance between energy produced and energy consumed within an electrical network, the energy produced is continuously compared 25 to energy consumed. If the amount of energy consumed exceeds the amount of energy produced (result Y in test 25), the monitoring and management means of the electrical network transmit 26, to a plurality of systems according to the invention dispersed throughout the network, a consumption shedding setpoint of a predetermined amount of energy so as to adjust the amount of energy consumed to the amount of energy produced in the network.

Prior to transmission of appropriate remote control commands to the systems according to the invention, the monitoring and management means of the electrical network calculate the accumulation of deficit energy consumption it must shed to balance the network. It substantially corresponds to the difference between the cumulative energy produced and the energy consumed in the network. The monitoring and management means of the electrical network, through requests in a database identifying the systems according to the information, determine the corresponding customer account, the corresponding address in the telecommunications network backed up by the electrical network to be able to remotely control them. Other information is needed such as the number of devices according to the invention in each terminal installation for correcting the amounts of energy and resulting power values, the maximum shedding capacities and any other information considered relevant by the operator. Appropriate algorithms taking account addressing opportunities in the telecommunications network for remotely controlling systems according to the invention, and shedding capabilities of each system to reach the required cumulative figures are performed to determine systems receiving the at least one setpoint. An additional step 27 is provided in the method to record the event in a database: a determined system according to the invention, linked to a customer account, received, at a given date and time, a remote control order to shed consumption associated with a given amount of electrical energy. This step 27 targets the saving of information needed later in the framework of the operation of the invention from an economic perspective. The invention further provides that means to switch ON driven power loads with associated energy storing capacities, should it appear that production of energy in the electrical network exceeds demand, must be implemented in the same apparatuses and in the same related management systems. The marginal cost of this functional addition is practically zero as it relies on the use of the same physical means as the invention and only the software embedded in devices 1 and in related management systems needs to be modified in consequence.

Figure 13:
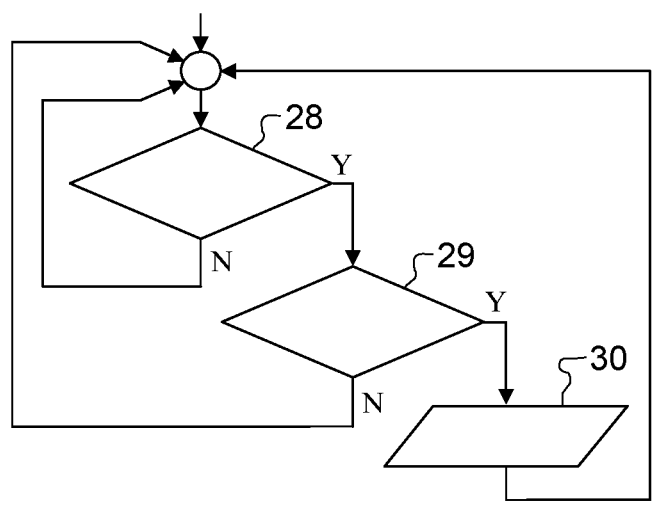
FIG. 13 illustrates the steps of the method related to the valuation.

FIG. 13 illustrates the steps of the method for producing information allowing the operation of the invention from an economic perspective.

When an invoice needs to be produced (result Y in test 28), for a given customer with respect to a given consumption period, a database is explored which stores time-stamped events that are the remote control transmission of orders to shed the consumption of a predetermined amount of electrical energy according to the invention. If this exploration of the database highlights events resulting from the implementation of the invention for the given customer over the given consumption period (result Y in test 29) then processes 30 are performed to enhance consumption shedding to the benefit of users who agree to this restriction of use, and where appropriate to the benefit of intermediaries providing aggregation of diffuse shedding capabilities, also taking into account any latent or effective shedding performed. Derogation requests from customers that result in the transmission of a setpoint canceling the effect of the reception of a prior shedding setpoint lead to corrections if necessary.

Of course, the invention is not limited to the embodiments described above and many modifications can be made therein without departing from the scope of the invention, in particular by combining several variants in the same implementation or by differently combining elements taken from several examples.

The invention claimed is:
1. A device for driving at least one power electric load in order to reduce an electric power likely to be consumed in a terminal installation of an electrical network, the terminal installation including an electrical energy meter downstream of which the device is connected, the device comprising:
one or more processors configured to receive at least one setpoint associated with a predetermined amount of energy whose reception triggers a limitation, for a determined time length, of the electric power consumable by the at least one power electric load, at a determined upper limit value that is less than a maximum operating power of said at least one power electric load.

2. The device according to claim 1, wherein, when the at least one power electric load is ON when the at least one setpoint is received, the electric power consumed by the at least one power electric load is effectively reduced, for the determined time length, to a determined value that is less than the electric power consumed before the reception of the at least one setpoint.

3. The device according to claim 1, wherein the determined time length is imposed by the reception of the at least one setpoint.

4. The device according to claim 1, wherein the determined time length is calculated according to the value of the electric power and said predetermined amount of energy.

5. The device according to claim 1, further comprising a memory,
wherein said value of the electric power is obtained from information contained in the memory of the device.

6. The device according to claim 1, further comprising an interface configured to communicate with the electrical energy meter of the terminal installation of the electrical network downstream of which the interface is connected.

7. The device according to claim 6, wherein the determined time length is calculated according to the value of a power and the predetermined amount of energy, said value of the power being obtained from at least one measurement transmitted by the electrical energy meter downstream of which the device is connected.

8. The device according to claim 1, wherein said value of a power is obtained from measurement hardware configured to measure the electric power in the device.

9. The device according to claim 1, wherein the determined time length during which the electric power is limited and/or reduced takes into account the electrical network voltage in said terminal installation.

10. The device according to claim 1, further comprising a communication system configured to communicate with at least one information system.

11. The device according to claim 1, wherein driving of the at least one power electric load is modified according to at least one information related to a functional status of the at least one power electric load and/or of resources associated with the at least one power electric load.

12. The device according to claim 1, further comprising software executed by the one or more processors to limit the power consumed in the terminal electrical installation by appropriate driving of the at least one power electric load.

13. The device according to claim 1, further comprising at least one input interface configured to transmit at least one command from an external apparatus to the at least one power electric load in the absence of a power limitation and/or a power reduction.

14. The device according to claim 1, further comprising a user interface configured to receive input from a user to deviate from receiving the at least one setpoint.

15. A system for reducing the electric power, likely to be consumed and/or effectively consumed by the at least one power electric load in the terminal installation of the electrical network, the system comprising:
the device according to claim 1; and
the at least one power electric load.

16. The system according to claim 15, wherein the system forms a sanitary water heating apparatus.

17. The system according to claim 15, wherein the system forms a heating and/or cooling apparatus.

18. The system according to claim 15, further comprising a tank or an accumulator configured to contain a liquid, a gas, a solid, or a phase-change material and configured to store energy locally as heat, cold, chemical, mechanical, or electrical energy to fully or partly offset insufficient energy production in the electrical network.

19. The system according to claim 15, wherein a local energy production system is configured to fully or partly offset insufficient energy production in the electrical network.

20. A method for operating a plurality of systems in the electrical network according to claim 15, the method comprising:
continuously monitoring a balance between electricity consumption and production in said electrical network by an appropriate supervision and management system; and
transmitting, by said appropriate supervision and management system, to a determined plurality of systems, the at least one setpoint to adjust consumption of electricity to production by reducing demand for electric power in the case of a given deficit production.

21. The method according to claim 20, further comprising:
storing, in at least one information system, at least one information related to the transmission by said appropriate supervisory and management system, to a determined plurality of systems, of at least one setpoint to adjust the consumption of electricity to production by reducing electric power demand.

22. The method according to claim 21, further comprising:
accounting in at least one information system of the amount of energy consumption that has been avoided in an installation where the at least one information system is implemented.

23. The method according to claim 22, further comprising:
differentiated accounting, in the at least one information system, of the amount of energy consumption avoided, depending on whether the at least one power electric load is ON or OFF when the at least one setpoint is received by the device driving the at least one power electric load.

24. The method according to claim 20, further comprising:
formulating a derogation request.

25. The method according to claim 20, wherein said supervision and management system uses the addressing capability of a remote control system used to transmit the at least one setpoint to approach a perfect balance between consumption and production in said electrical network.

26. The device according to claim 1, wherein, when the at least one power electric load is OFF, or is ON with a consumption below a given power when the at least one setpoint is received, the setting ON, or a consumption beyond the given power, of the at least one power electric load is prevented for the determined time length.

* * * * *